Figure 32:
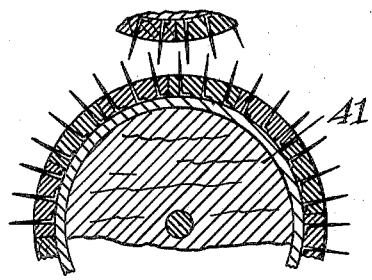

G. W. SCHLICHTEN.
MEANS FOR TREATING FIBER BEARING PLANTS.
APPLICATION FILED DEC. 27, 1916.
1,308,376.
Patented July 1, 1919.
8 SHEETS—SHEET 1.
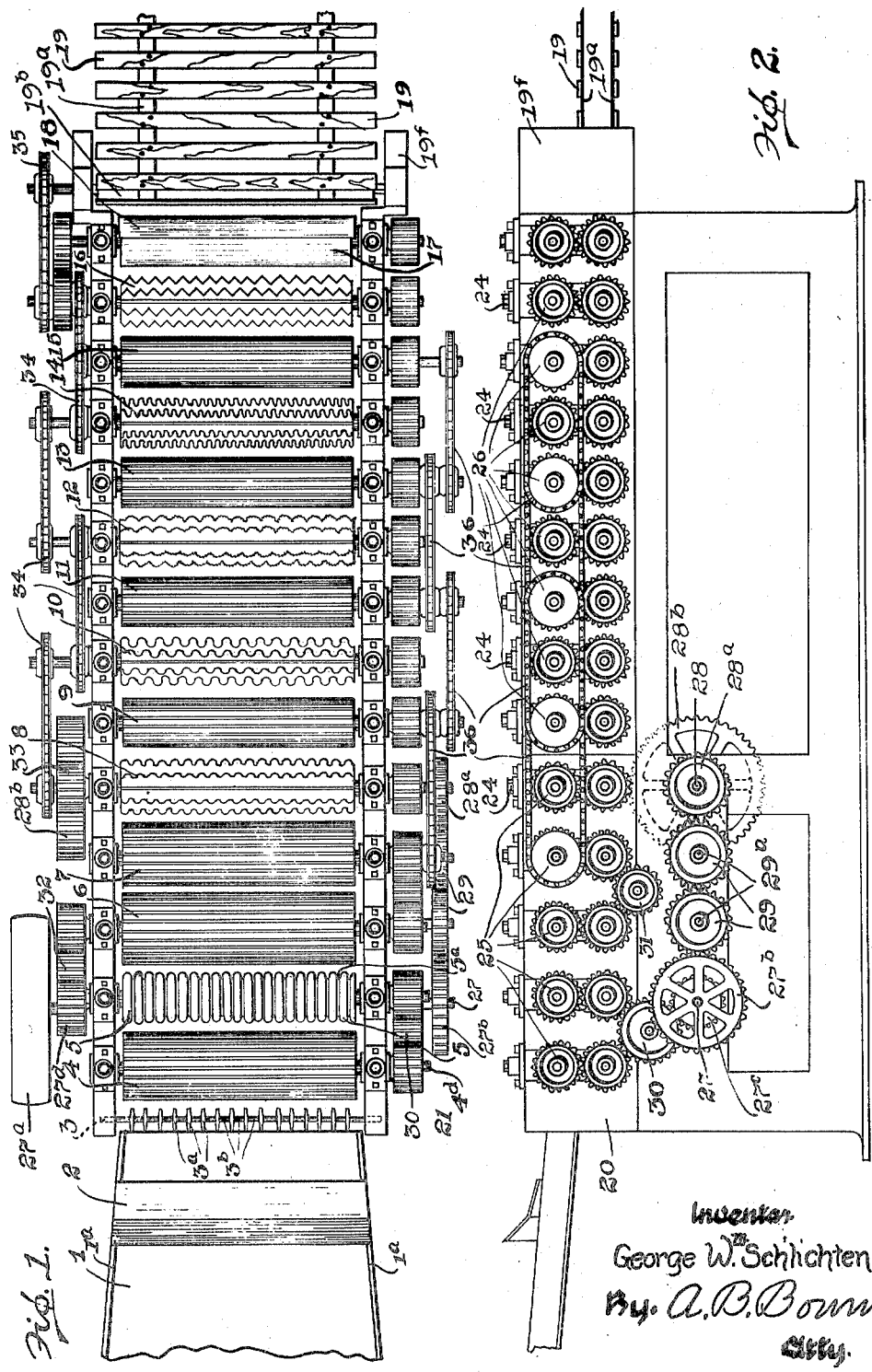
Inventor
George W. Schlichten.
By A. B. Bowman
Atty.

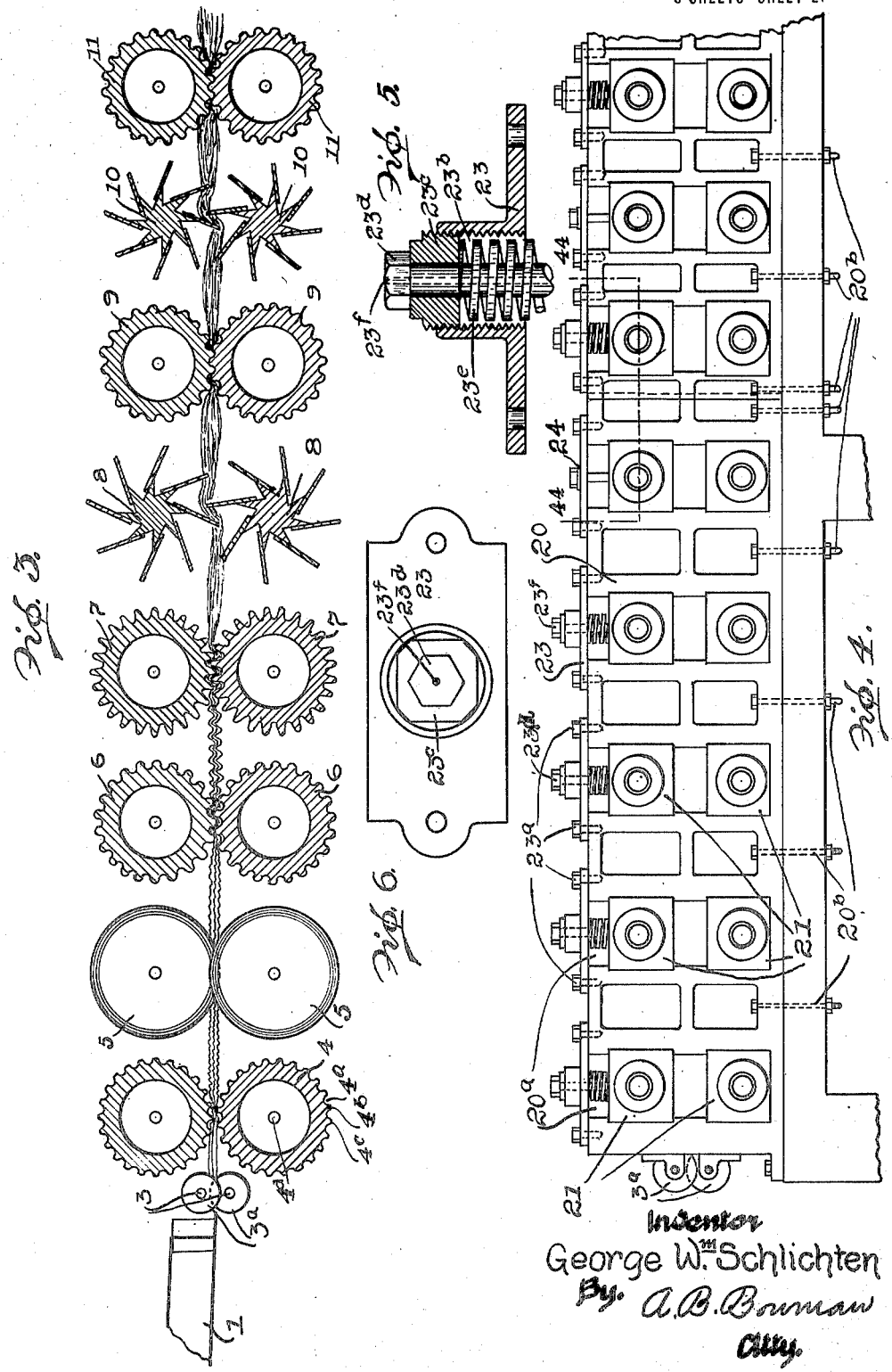

G. W. SCHLICHTEN.
MEANS FOR TREATING FIBER BEARING PLANTS.
APPLICATION FILED DEC. 27, 1916.
1,308,376.
Patented July 1, 1919.
8 SHEETS—SHEET 3.
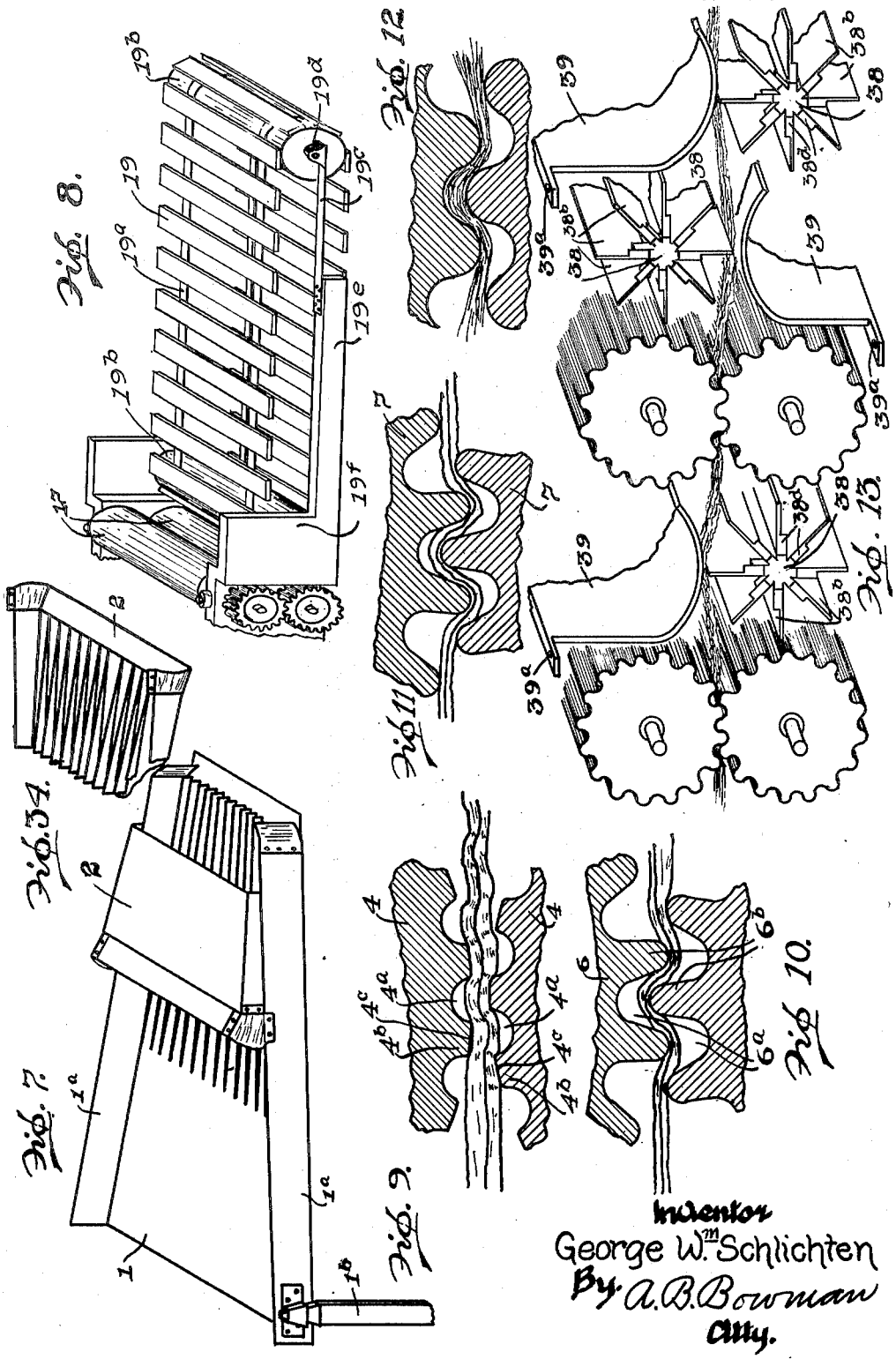

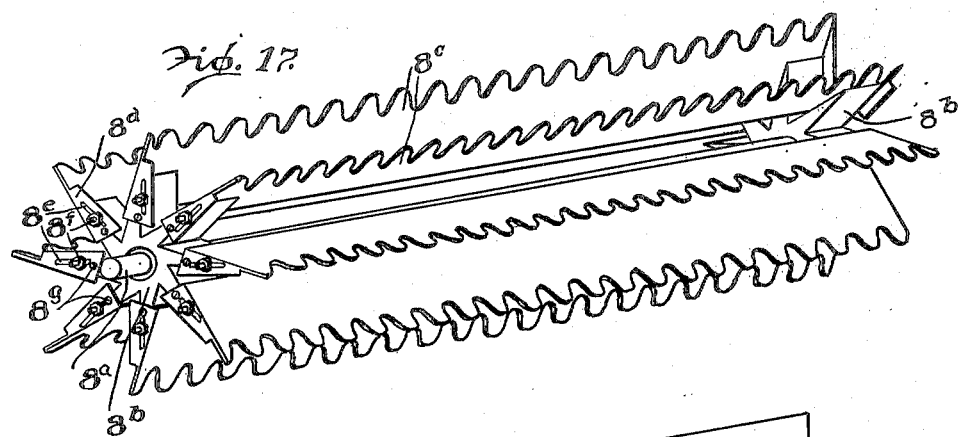
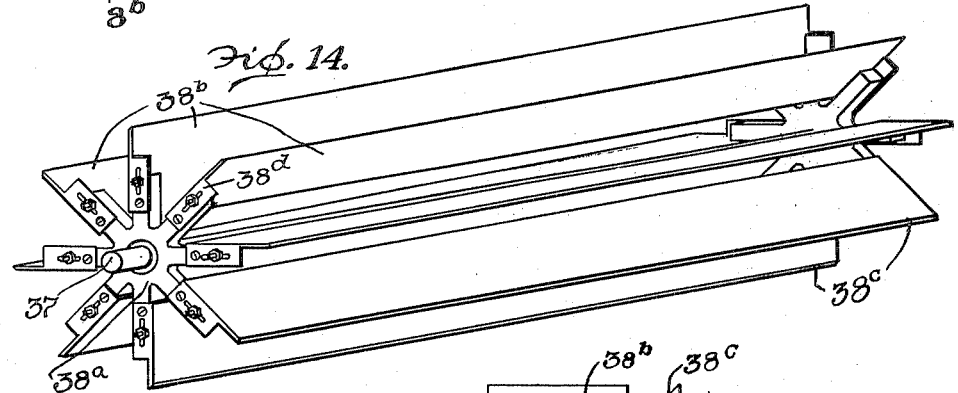
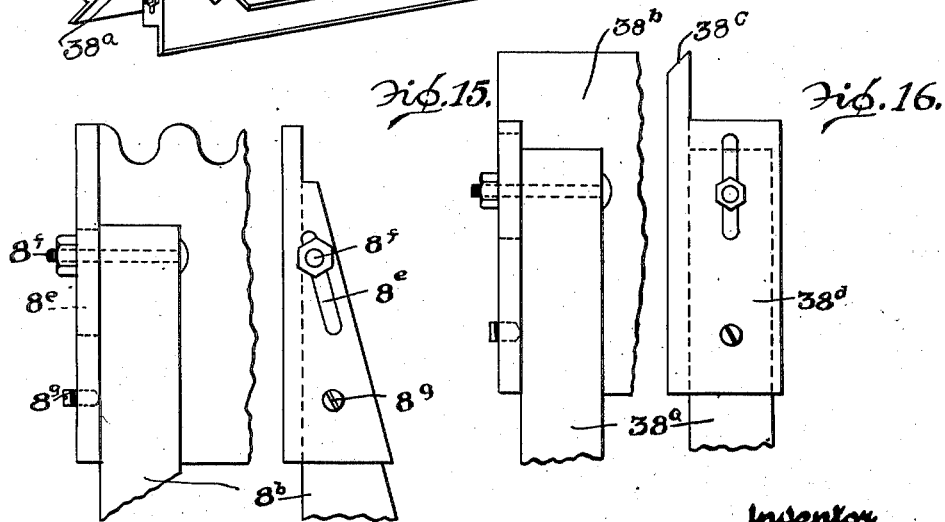

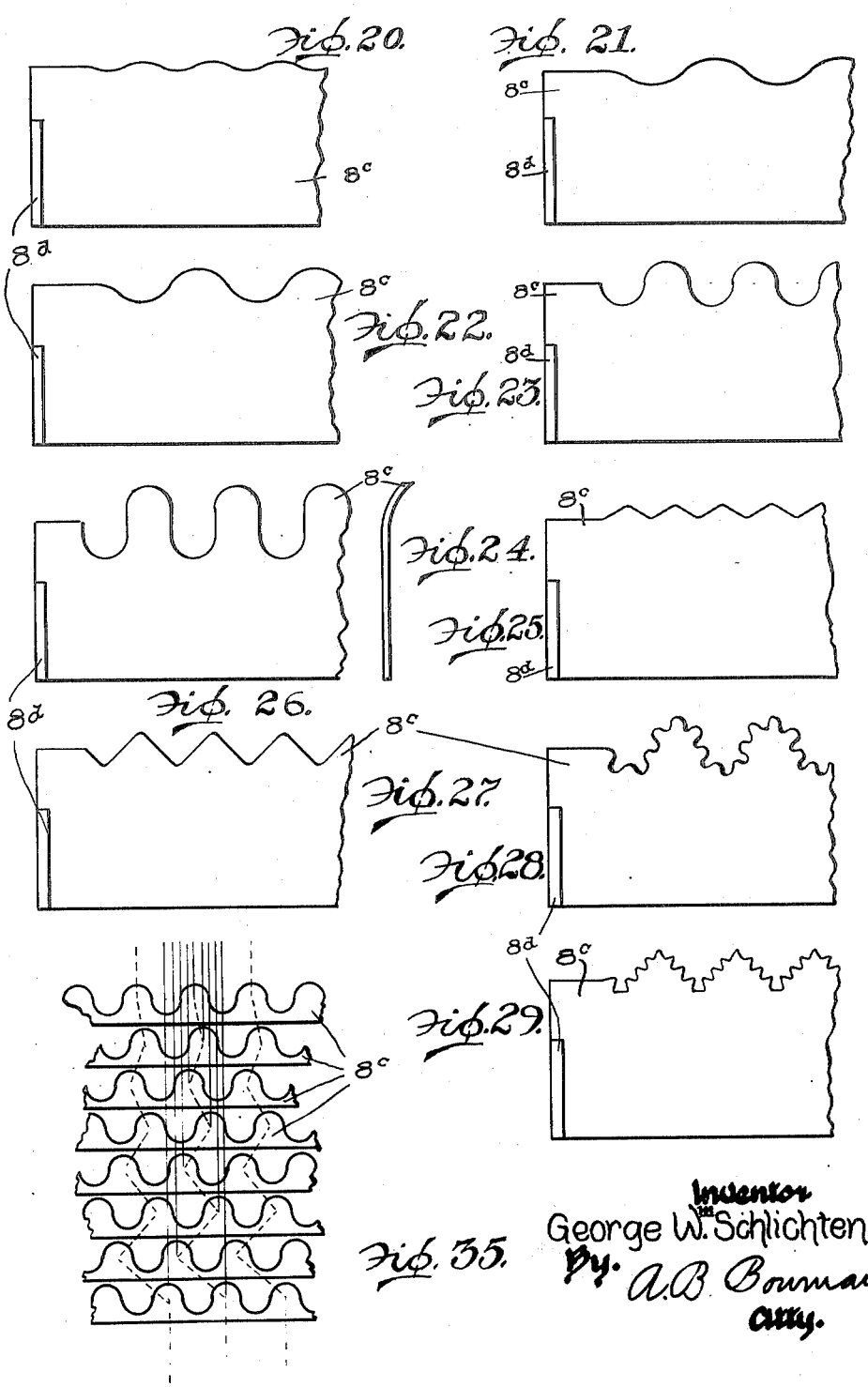

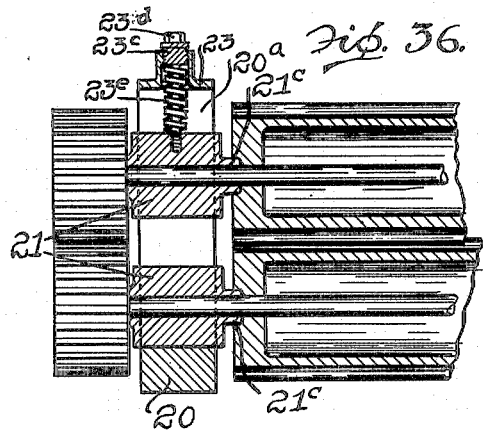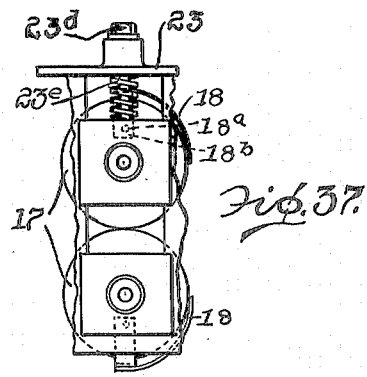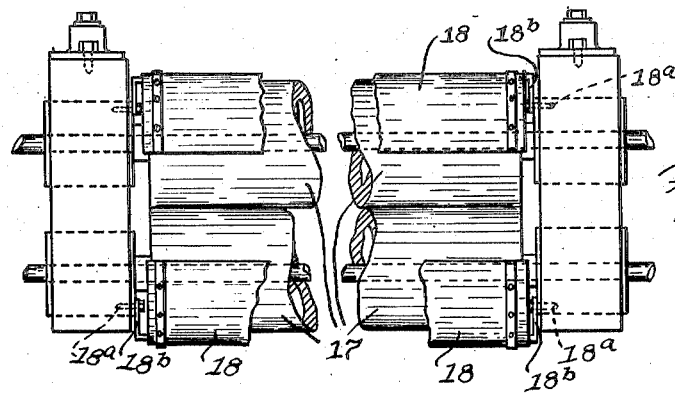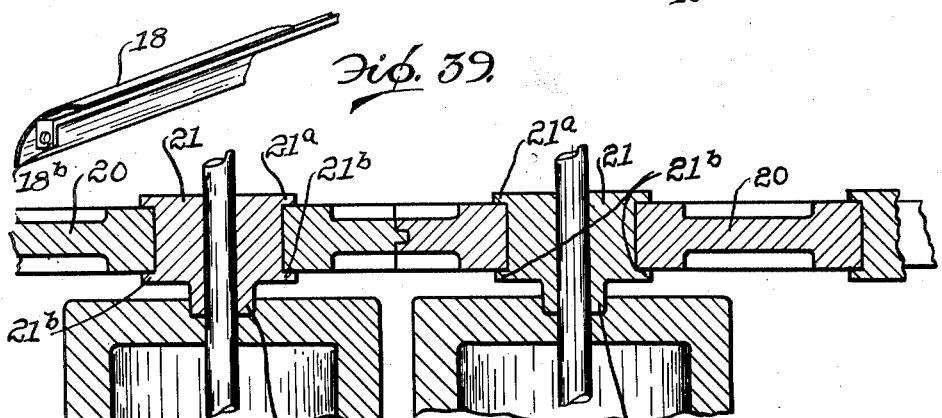

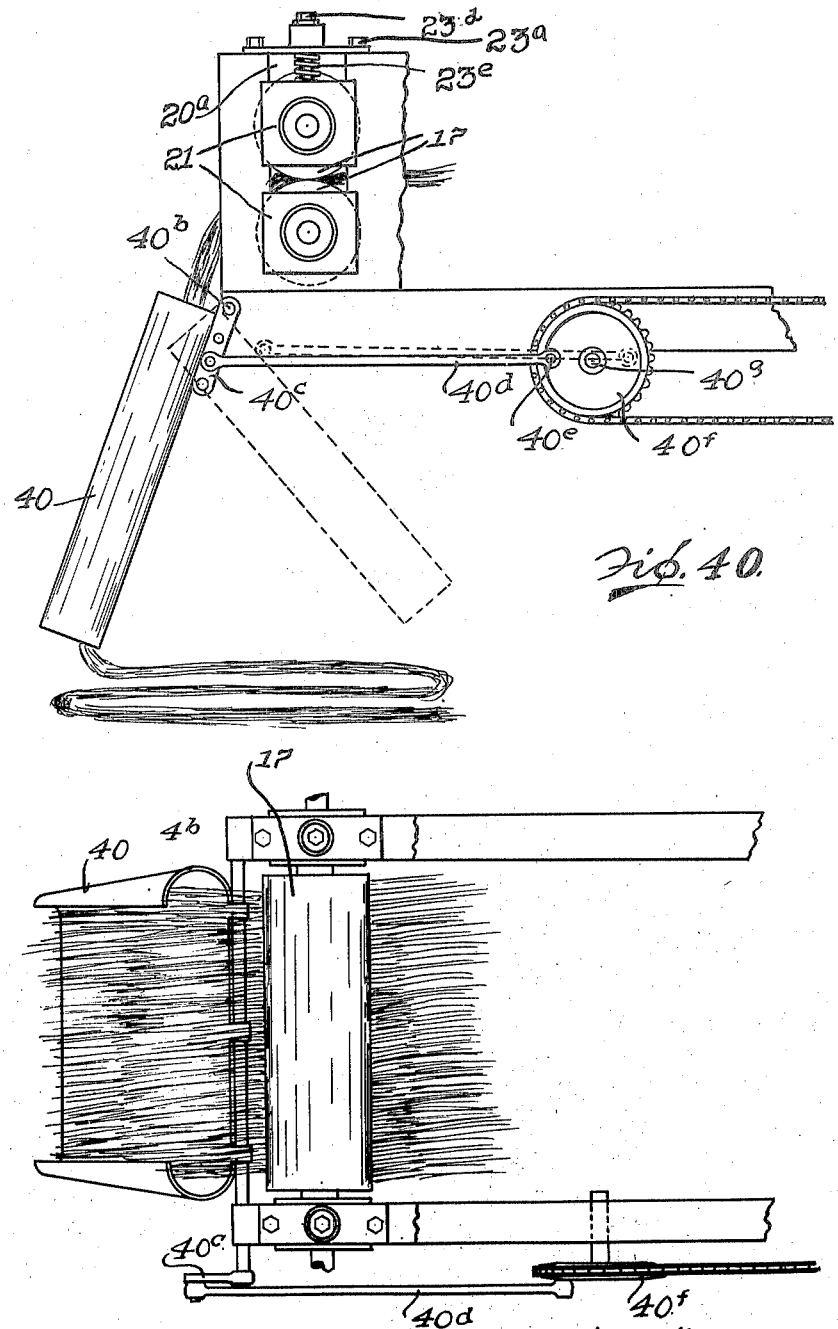

UNITED STATES PATENT OFFICE.

GEORGE WILLIAM SCHLICHTEN, OF SAN DIEGO, CALIFORNIA.

MEANS FOR TREATING FIBER-BEARING PLANTS.

1,308,376. Specification of Letters Patent. Patented July 1, 1919.

Application filed December 27, 1916. Serial No. 139,181.

*To all whom it may concern:*

Be it known that I, GEORGE WILLIAM SCHLICHTEN, a citizen of the United States, residing at San Diego, in the county of San Diego and State of California, have invented certain new and useful Means for Treating Fiber-Bearing Plants, of which the following is a specification.

My invention relates to a means for decorticating, mechanically degumming, cleaning and otherwise producing fiber from fiber-bearing materials such as ramie stalks or any other stem fiber plants, more particularly in their dry unretted and untreated form, and the objects of my invention are; first, to provide means for decorticating, mechanically degumming, cleaning, stripping, scutching, combing and otherwise producing fiber from all kinds of fiber-bearing materials such as ramie, flax, hemp, jute, sesbania, nettles and other stem fiber plants in their unretted and untreated form; second, to provide means for freeing the fiber-bearing materials simultaneously with the preparation of the fiber of its gum in the form of crystals and dust, to such a degree that the fiber produced is at once ready and suitable for carding or combing without any further treatment such as degumming or retting, and leaving the fiber soft, pliable, adhesive and in its unimpaired, natural strength and color, and yielding the maximum of fiber contained in the fiber-bearing material; third, to provide means for so separating the residue such as the woody matter, pulp, leaves, gum, etc., from the unretted fiber-bearing material so as to preserve the same as a byproduct for use in various ways, for instance, the woody and pulpy matter is so treated as to be suitable material for paper pulp, the leaves are so treated as to be suitable for stock food or fertilizer, and the gum is so treated as to be readily utilized for drug purposes such as canabin and other drug principles and for glue and other various commercial commodities; fourth, to provide means whereby fibers of any fiber-containing plant such as bean straw, cotton stalks and the like, as well as any vine growth can be produced as well as the fibers contained in leaves such as the agave or cactus species, or the so called Manila hemp, New Zealand flax or any other leafy growth; fifth, to provide means for so treating fibers that the treated product may be produced very cheaply and economically and in particular the fiber of ramie and hemp for the following reason:

Ramie, the most valuable of fiber plants, is a perennial and can be grown cheaply in suitable climates producing from four to six annual crops, and hemp of the *Cannabis sativa* variety while being an annual is adapted to all climates and suitable for almost all purposes for which vegetable fibers are used can be grown as simply as grain and harvested as easily and only needs to be field or sun dried for the purpose of producing the fiber thereof through my means, thereby becoming as simple a farm crop as grain. I therefore believe that the principal use of my invention will be for the production of fibers from ramie, hemp and similar stem fiber plants and I therefore will describe my means more particularly for use in treating such fiber plants; sixth, to provide means of the class described which is simple and economical of construction, durable, easy to operate, will not readily deteriorate or get out of order, and is adjustable throughout; seventh, to provide a means of the class described which requires a minimum of preparation of the stalks or fiber-bearing material to be treated before it is ready for treatment by my means; eighth, to provide means of the class described whereby the parts are interchangeable so that substitution may be made of the parts for treating different kinds, classes and characters of fiber-bearing substances; ninth, to provide means of the class described in which each and every apparatus and the parts thereof, and the substituted parts are adjustable; tenth, to provide means for preventing the fiber from wrapping on the shaft between the revolving apparatus and the shaft bearings.

Figure 33:
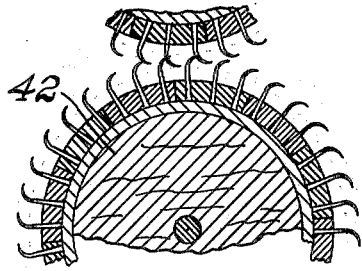
Figure 30:
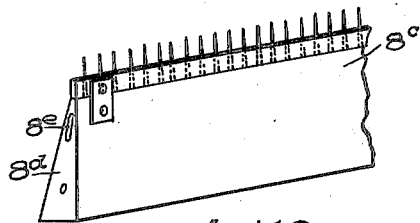
Figure 31:
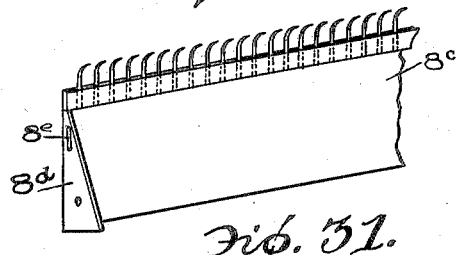
Figure 42:
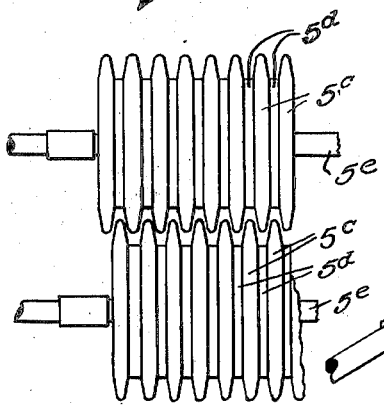
Figure 43:
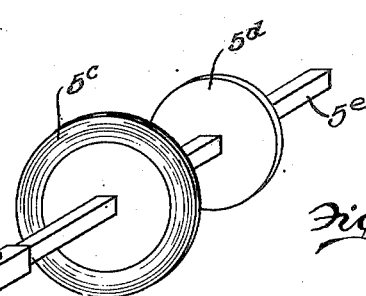

With these and other objects in view as will appear hereinafter, my invention consists of certain novel features of construction, combination and arrangement of the parts and their relations to each other, and the substitutions of parts, as will be hereinafter described in detail and particularly set forth in the appended claims, reference being had to the accompanying drawings and to the characters of reference thereon which form a part of this specification in which:

Figure 1 is a top or plan view of my apparatus in one form showing some of the parts fragmentarily. Fig. 2 is a side elevational view thereof. Fig. 3 is a sectional view through the middle of Fig. 1 of the fragmentary front portion of the apparatus, and showing the position of the fiber-bearing material and fiber in passing through the portion of the apparatus shown. Fig. 4 is a side elevational view of a fragmentary portion of one of the side frames with the bearings therein. Fig. 5 is a detailed sectional view through the middle thereof of the adjustment of the relative positions of the separate members in each set in the apparatus and the spring tension thereof, and showing portions in elevation to facilitate the illustration. Fig. 6 is a plan view thereof. Fig. 7 is a perspective view of the feeding apparatus alone. Fig. 8 is a perspective view of one form of the discharging apparatus. Fig. 9 is a sectional view of the crushing and denting rolls shown in their relative position to each other and showing the fiber-bearing material passing therethrough. Fig. 10 is a similar view of the first breaker rolls. Fig. 11 is a similar view of secondary breaker rolls. Fig. 12 is a similar view of the softening rolls. Fig. 13 is a perspective view of the softening rolls, whipper and shield showing a modified form from that of Fig. 1. Fig. 14 is a detailed perspective view of the whipper shown in Fig. 13. Fig. 15 is a detailed fragmentary portion of the whipper blade shown in Fig. 14 and showing its adjustment on the spider arm. Fig. 16 is a similar view at right angles thereto. Fig. 17 is a detailed perspective view of the form of rotating comber apparatus shown in Fig. 1 of the drawings. Fig. 18 is a fragmentary detailed view of a portion of the comber blade shown in Fig. 17 and its adjustment relatively to the spider arm. Fig. 19 is a similar view at right angles thereto. Figs. 20 to 31 inclusive are detailed fragmentary portions of various forms of comber blades with their teeth or projections. Figs. 32 and 33 are fragmentary transverse sectional views of pin combers in a slightly modified form from those of Figs. 30 and 31. Fig. 34 is a perspective view of one form of the feed table hood 2 shown upside down. Fig. 35 is a diagrammatic view showing the relative positions of the various teeth or projections positions on the blades showing them in the preferable staggered positions. Fig. 36 is a sectional view through the middle of Fig. 37 showing a fragmentary portion of the discharging roll and the means thereon for preventing the fiber from winding on the rolls. Fig. 37 is an end view thereof. Fig. 38 is a rear elevational view thereof in fragmentary form. Fig. 39 is a detailed fragmentary perspective view of the guard for preventing the fiber from wrapping on the delivery rolls. Fig. 40 is a side elevational view of a mechanical apron, its attachment and driving mechanism for delivering the fiber from the machine in a modified form from that of Fig. 8 and showing by dotted lines the other position of the apron in its movement, and Fig. 41 is a plan view thereof. Fig. 42 is a front elevational view of the splitting and spreading rolls in one form shown in their operative relation to each other. Fig. 43 is a detailed perspective view showing the construction of said rolls, and Fig. 44 is a fragmentary sectional view of one side of the frame through 44—44 of Fig. 4 of the drawings showing the bearings in position in the frame and fragmentary portions of the rolls in position.

Similar characters of reference refer to similar parts throughout the several views.

My means treats the fiber-bearing material as follows: First, it is placed in the feed table which is preferably provided with a corrugated bottom as shown best in Fig. 7 of the drawings, which spreads the said material uniformly thereon and guides it into the machine, the construction of the feed table is such that it regulates the quantity of material passing into the machine; however, for these corrugations in the feed table there may be substituted a device for the same purpose consisting of revolving disks suitably spaced apart from each other on stationary shafts, one above the other, the disks on the upper shaft interspacing with the ones on the lower shaft and said shafts are adjustably mounted in the frame of the machine at the ends. This feed table and substituted device also serves to keep the fiber stalks or fiber-bearing material separated and straight. Next the fiber-bearing material passes between the crushing and denting rolls which crush the stalks or material and slightly dents the outer surfaces of the same as shown best in Fig. 9. It then passes between the splitting and spreading rolls which splits, spreads and separates the portions of the flattened fiber stalks or material and also acts as a breaker for said stalks or material that pass in crosswise or at an angle otherwise than straight. The fiber plant material then passes between the first breaker rolls which are so arranged relatively to each other as to start the breaking of the woody or pulpy material as shown best in Fig. 10. It then passes between secondary breaker rolls which are in closer proximity to each other as shown best in Fig. 11 which thoroughly break the woody matter up into small particles. It then passes between the first rotating comber apparatus which starts the cleaning of the fiber and the degumming thereof by separating and eliminating the particles of woody or pulp matter, bark, gum and other products not fiber from the fiber. It will be here noted that the revolving comber apparatuses revolve at a higher speed than the preceding apparatuses which facilitates the combing effect and action on the fiber. The material then passes between softening rolls which perform the double function of softening the fiber by contact and holding it in position for action of the combing apparatus by reason of the corrugated surfaces of the softening rolls contacting with each other with the fiber between them as shown best in Fig. 12. It then passes through another comber apparatus which may be of different construction in its teeth or projections resulting in a more thorough cleaning and degumming of the fiber. It then passes through as many more alternate softening and combing apparatuses or substitutes therefor that perform the same functions as are necessary to thoroughly eliminate all substances not fiber from the fiber. It then passes between a pair of discharging rollers for delivering the material from the apparatus in the form of a straight line fiber. This fiber then passes upon an endless slatted carrier which has a shaking motion adapted to eliminate any small waste particles that may yet be contained in the fiber. This carrier delivers the fiber straight in line and ready to be hanked and baled. For this slatted carrier may be substituted a mechanical apron shown in Figs. 40 and 41 which discharges the fiber in endless folded form.

The following constitute the principal parts of my apparatus: The feed table 1, hood 2, feed guides 3, crushing and denting rolls 4, splitting and spreading rolls 5, primary breaker rolls 6, secondary breaking rolls 7, coarse rotating comber 8, softening rolls 9, rotating comber apparatus 10, softening rolls 11, rotating comber apparatuses 12, softening rolls 13, rotating comber apparatuses 14, softening rolls 15, rotating comber apparatuses 16, discharging rolls 17, discharging roll guard 18, carrier 19, side housings 20, bearings 21, bearings 22, bearing adjustments 23, bearing adjustments 24, gears 25, gears 26, main drive shaft 27, high speed shaft 28, intermediate gear 29, intermediate gears 30, intermediate gear 31, intermediate gear 32, gear 33, chains 34, chain 35, chains 36, shafts 37, whippers 38, guards 39, mechanical apron 40, comber apparatus 41 and comber apparatus 42.

The feed table 1 consists of a flat member provided with vertical sides $1^a$ and it is secured to the frame at its one end and at its free end is supported by a pair of adjustable leg members $1^b$ so that said feed table may be provided with the proper angle to lead the material to the apparatus. Mounted in the front end of the frame and adjacent the inner end of the feed table 1 are the feed guides 3 which consist of a pair of stationary shafts spaced apart some distance and adjustable relatively to each other. Upon these stationary shafts are revolubly mounted a plurality of disks $3^a$ which are held in their spaced relation by means of short revoluble sleeves $3^b$ mounted on said shafts which serve as separators for said disks. These shafts are so positioned that the disks on one shaft set in between the disks on the other and the material to be treated feeds in between the two shafts and is controlled and spread by the disks, also the feeding space is regulated by the space between the two shafts. In lieu of the feeding mechanism 3 I have provided a substitute feed table which consists in corrugating the inner end of the bottom portion of the feed table as shown best in Fig. 7 of the drawings. These corrugations gradually recede outwardly to the level of the feed table as shown best in Fig. 7 of the drawings. Over this corrugated portion is a hood 2 which is mounted thereon so as to be adjusted both vertically and horizontally so as to regulate the quantity of feed passing between the table bottom and said hood. This hood is also provided with a corrugated inner surface constructed in the same manner as the corrugations on the feed table shown best in Fig. 34, and they are positioned in relation to the corrugations on the feed table so that if they are positioned close enough together the upper corrugations come in the middle of the grooves of the feed table. The objects of these corrugations are to properly spread and hold the material straight as it is fed into the apparatus and to regulate the quantity of feed. When this substituted feed table with the corrugations as shown in Fig. 7 is used the lower shaft and disks shown in Fig. 3 should be removed; however, both shafts and disks may be removed if desired. The frames 20 which will be hereinafter described are spaced apart a suitable distance and between them are mounted the feed table and feeding apparatus just described and the apparatuses for treating the material as hereinafter described. Mounted in housings on the frame adjacent the feed table and adjustable relatively to each other are a pair of crushing and denting rolls 4 which are provided with shallow longitudinal grooves $4^a$ and corresponding ridges $4^b$ and said ridges are provided with flat surfaces $4^c$ for the purpose of crushing and flattening the stalks and indenting the outer surface thereof in conformity with said flat surface $4^c$. These crushing and denting rolls 4 are supported in the housing in spaced relation to each other so that they do not crush by contact any seed that may be contained in the material that passes between them. These rolls are secured to shafts $4^d$ which are mounted in bearings in the housings as hereinafter described. Similarly mounted in housings 20 and adjacent to these crushing and denting rolls are a pair of splitting and spreading rolls 5 adjustable relatively to each other. These rolls 5 are provided with circumferential grooves 5ª and corresponding ridges 5ᵇ and they are so positioned relatively to each other that the ridges in one fit into the grooves in the other without contacting. These splitting and spreading rolls are for the purpose of splitting, separating, spreading and opening the stalks or fiber-bearing material longitudinally and also serve as a breaker for such material that enters the apparatus crosswise or at any angle from the longitudinal. In lieu of said rolls I have provided substitute apparatuses which consist of a plurality of disks 5ᶜ spaced apart from each other by means of a plurality of separating members 5ᵈ so that the disks may be spaced different distances apart and different depth, grooves and ridges provided, shown best in Figs. 42 and 43 of the drawings. These disks and separators are slidably mounted upon a square shaft 5ᵉ so that they turn with the shaft when said shaft revolves. The primary breaker rolls 6 are cylindrical in form and are mounted in the housing of the frame similar to the crushing and denting rolls and are provided with longitudinal grooves 6ª in their outer surface and with corresponding ridges 6ᵇ. The ridges on the rolls are so positioned as to fit into the grooves in the other roll without contacting but fit in deep enough to start the breaking of the woody or pulpy matter of the material all as shown best in Fig. 10 of the drawings. The secondary breaking rolls 7 are similarly constructed but are so positioned relatively to each other that the ridges fit deeper into the grooves and deep enough so that in their operation the woody matter of the fiber material becomes small, broken and separated particles without bruising or injuring the fiber all as shown best in Fig. 11 of the drawings.

It will be here noted that the apparatuses 4, 5, 6 and 7 as hereinbefore described provide means for breaking up the waste material contained in the fiber-bearing material and I will now proceed to describe the means for eliminating this waste material or by-product from the fiber. Mounted in the housings adjacent the secondary breaking roll 7 are a pair of rotating comber apparatuses. These rotating comber apparatuses are geared so that they rotate at a greater speed than the preceding apparatuses as will be hereinafter described. These combers consist of a shaft 8ª upon which is secured a pair of spiders 8ᵇ, one near each end thereof. The spider arms are positioned at an angle to the radial and on these arms are adjustably mounted the blades 8ᶜ. The ends of said blades are bent at right angles at 8ᵈ and are provided with slots 8ᵉ therein adapted for the bolts 8ᶠ providing for shifting the blades outwardly or inwardly on said arms, and mounted in said right angle portion are set screws 8ᵍ which are adapted to permit the shifting of the blades relatively to said arms on various angles as desired. The purpose of the angles of the blades and arms is so that the outer edges or projections of the blades do not engage the fiber in a direct line but do so on an angle to prevent the teeth or projections in the blades in their action upon the fiber from fastening in the same, thus preventing the winding of the fiber on the rotatable comber. These comber blades are provided in their outer edges with a plurality of points, projections, teeth or other suitable means of any degree of fineness or construction which penetrate into or act upon the fiber material. Some of said various forms of points, projections and teeth are best illustrated in Figs. 20 to 33 of the drawings. It will be here noted that these points, projections and teeth are preferably so positioned on adjacent blades that they are in staggered position relatively to each other as shown best in the diagrammatic view, Fig. 35 of the drawings, and also that the teeth, points and projections on the blades of the upper and lower rotating comber apparatuses are similarly positioned in staggered relation to its opposing blades on the other apparatus thus keeping the fiber between them going in a straight line and parallel with the sides of the apparatuses at all times, and also that the blades on one of the apparatuses operates between two adjacent blades on the opposing apparatus as shown best in Fig. 3 of the drawings and at a certain degree of depth to be adjusted in accordance with the kind of material to be treated. It will also be here noted that the combing apparatus as just described provides besides the degumming, combing, cleaning and separating action means consisting in the projections on the comber blades for penetrating into every part of the fiber strands and acts on every part of it in every angle through friction, scutching, beating, stripping in every possible manner which is adapted to free the gum, loose woody matter, bark or anything not fiber from the fiber. This action, it will be noted, frees and eliminates the gum from the fiber in tiny crystal form in appearance like dust. It will also be here noted that inasmuch as the rotating comber apparatus rotates at a greater speed than the preceding apparatus that every part of the fiber is acted upon by the projections on the rotating comber apparatus a great many times while it passes therethrough. In lieu of or in addition to the rotating comber apparatus may be substituted or used for certain purposes a rotating, adjustable whipper as shown best in Figs. 14, 15, 16 and 13 of the drawings. This whipper consists of a shaft 37 the same as the shaft of the rotating comber and mounted near each end is a spider 38ª which is similar to the spider 8ᵇ except that the arms are radial. Mounted on the arms of the spider 38ª are the whipper blades 38ᵇ which are provided with beveled edges 38ᶜ and with right angled bends at the ends 38ᵈ. These whipper blades are adjustably mounted on the arms in the same manner as the rotating comber apparatus slats are secured to their spider arms so that they may be adjusted in the same manner as to angle, etc. These whippers are positioned similarly to the combers in practically the same relative position and in some cases with certain kinds of material I substitute a U shaped guard 39 in place of one of the whippers as shown best in Fig. 13 of the drawing which facilitates a scutching action on the fiber by the whipper. These guards are for the further purpose of guiding the fiber material into the succeeding apparatus and hold it in position for action by the whippers. These U shaped supports are secured to the housings at their ends by means of bolts through the projections 39ª and into the upper and lower sides of the housings. These whippers and guards may be positioned either above or below and side by side as desired as shown in Fig. 13 of the drawings. The softening rolls 9 are revolubly mounted in the housings of the frame and adjustably relative to each other. They are provided with longitudinal, corrugated surfaces which intermesh and are for the purpose of softening and spreading the fiber and holding it taut in the proper position for action by the rotating comber apparatuses and loosens the bark and gummy matter which is thereafter eliminated by the rotating comber apparatuses. The remaining rotatable comber apparatuses such as 10, 12, 14 and 16 are similarly constructed, positioned and operated as the rotatable comber apparatus 8 but may be provided with different forms of teeth, projections and points as shown in Figs. 20 to 33 of the drawings depending on the kind of material to be treated or the extent of the treatment desired and are used to clean the fiber suitable for different uses, also a pair of softening rolls are placed between each rotating comber apparatus similar to the softening roll 9 hereinbefore described such as the rolls 11, 13 and 15 which perform the same function as the roll 9 as hereinbefore described. It will be here noted that any apparatuses such as the softening rolls, rotating combing apparatuses, whippers, whipper guards and their different substitutions may be interchanged, added to or taken from to provide for different kinds of material to be treated as desired. Mounted at the rear end of the apparatus and revolubly mounted in the housing are a pair of discharging rolls 17 which are preferably cylindrical in form and adapted to contact at their adjacent surfaces and they are preferably speeded a little faster than the other preceding apparatuses to provide a pulling action. Mounted adjacent to these rolls are the guards 18 which are concave surface guards secured to the bearings by means of bolts 18ª through lugs 18ᵇ and into said bearings. The free side of said guard engages the outer surfaces of the rolls slightly below the middle thereof and are for the purpose of preventing the fiber from wrapping on the rolls. A portion of said guard is shown best in Fig. 39 of the drawing. Mounted on the rear end of the apparatus adjacent said discharging rolls is the slatted carrier 19 which consists of belts 19ª mounted on rollers 19ᵇ which are secured to shafts which are revolubly mounted in bearings in the housing and with slats spaced apart secured to the belts thus providing an endless belt carrier for carrying the finished fiber product away from the discharging rolls. The outer roller, see Fig. 8, is supported by flexible supports 19ᶜ which are provided on their outer ends with bearings 19ᵈ adapted for the outer roller shaft. These flexible supports 19ᶜ are supported in cantaliver form to the rigid supports 19ᵉ which are in turn secured to the frame 19ᶠ which is detachably secured to the extended end of the frame of the apparatus. It will be here noted that the slats are longer than the frame is wide to provide for the proper handling of the fiber discharged from the discharging rolls as it spreads when leaving said discharging rollers. The object of the flexible supports 19ᶜ is to provide a shaking motion to the carrier 19 by reason of the vibration of said supports for thoroughly shaking the discharging fiber to eliminate any waste products that may still be left in the fiber. In lieu of said delivery carrier I have substitued a mechanical apron to be used under certain conditions where endless feeding is desired or preferred as this apron delivers the fiber in folded endless form ready for baling, which apron is shown in Figs. 40 and 41 of the drawings. When this mechanical apron is used the delivery carrier as shown in Fig. 8 of the drawings and previously described is removed and the mechanical apron 40 is pivotally mounted on the end of the frame adjacent to the discharging rolls by means of bearing lug 40ª which is secured to the end of the frame and supports the shaft 40ᵇ, and revolubly mounted on said shaft are a pair of bearing lugs 40ᶜ which are secured to said apron and form hinges upon which said apron is swung. This apron is preferably shaped as shown best in Figs. 40 and 41 of the drawings, the sides converging downwardly forming a tapered discharging apron. Pivotally connected to these lugs 40$^c$ is the shaft 40$^d$ which is pivotally connected at its lower end to a lug 40$^e$ which is secured to the wheel 40$^f$, which wheel is revolubly mounted on the housing on the axle 40$^g$ which provides that the shaft 40$^d$ is eccentrically connected to the wheel 40$^f$ for moving the apron back and forth on the rod 40$^b$. This wheel 40$^f$ is driven by chain from any of the preceding apparatuses and is run at a suitable speed to properly lay the fiber in position when discharging from the apron.

The housing 20 consists of the two side pieces which are alike in construction, therefore I will describe one only. They are built up in sections as desired and in Fig. 4 of the drawings I have shown the two sections connected together, the joints being formed preferably by tongue and groove joints as shown best in Fig. 44 of the drawings. Each section is made up preferably of cast iron provided with a plurality of vertical notches 20$^a$, one for each set of apparatuses. The separate section of housings are secured to the main frame by means of bolts 20$^b$ so that the relative position of the bearings on the separate sections always remain the same. Mounted in each of these notches 20$^a$ are a pair of bearings 21 which are provided with oppositely disposed vertical flanges 21$^a$ and 21$^b$ and between said flanges are grooves which fit the edges of the walls of the notches so that said bearings 21 may shift up and down in said notches. Each of the bearings are provided with annular projections 21$^c$ which project into the various rolls and rotating apparatuses as shown best in Figs. 36 and 44 of the drawings so that the material treated will not wind on the shaft or between the bearing and roll or rotating apparatus and also prevent the shafts from gathering dust or dirt, preventing needless friction which would cause the bearings to heat. The lower bearing rests in the bottom of the notches 20 and the upper bearing rests in said notch and is supported by means of the bearing adjustments 23 which consist of a cap which is secured over said notch by means of bolts 23$^a$ which is provided with an internally threaded hole 23$^b$ in which is screwed adjusting member 23$^c$ which is provided with a central hole in which is reciprocally mounted the bolt 23$^d$, its head normally resting on said adjusting member 23$^c$. Mounted around said bolt and between said adjusting piece 23$^c$ and the top of the upper bearing is a compression spring 23$^e$. Centrally and longitudinally through said bolt is a hole 23$^f$ adapted to provide means for oiling the bearings through said bolt. It will be here noted that the bolt 23$^d$ holds the upper bearing in its normal position, that the spring 23$^e$ is of suitable strength to hold the upper bearing in position to produce the proper tension or pressure of the upper rolls toward the lower rolls, the space, however, between said rolls or rotating apparatuses may be widened or narrowed by turning the bolt 23$^d$ in the proper direction in the adjusting member 23$^c$, and that the tension of the spring may be changed by turning the adjusting member 23$^c$ in the cap 23 thus providing adjustment for both the position of the rolls or rotating apparatuses relatively to each other, and the tension of the spring 23$^e$. It will also be here noted that the spring 23$^e$ is for the purpose of increasing or decreasing the pressure between the rolls or rotating apparatuses as desired. In some of the bearings, however, the spring 23$^e$ and adjusting member 23$^c$ may be dispensed with, in which case the cap 23 is a plain cap as shown in some of the bearings in Fig. 4 of the drawings. This spring and its adjustment can be dispensed with for the purpose of facilitating the scutching operation on the fiber. The frame upon which the housings 20 are mounted may be of any suitable form whether the machine is to be used stationary or portable. The several sets of rollers or rotating apparatuses may be driven by any suitable means so as to rotate in the same direction at the proper speed. In this case I have shown them connected by gears. I prefer to drive the various sets of apparatuses as follows: I provide a main shaft 27 journaled in the frame of the apparatus. Upon one end of said shaft is rigidly secured a drive pulley 27$^a$ and upon the opposite end thereof a gear 27$^b$ which gear engages an intermediate gear 29 which in turn engages with another intermediate gear 29. These two intermediate gears are mounted on studs 29$^a$ which are rigidly secured to the main frame of the apparatus, and one of the intermediate gears 29 engages with a gear 28$^a$ on the shaft 28 which is the high speed shaft, the speed being obtained by means of the gears 27$^b$, 29 and 28$^a$, and mounted on the opposite end of this high speed shaft 28 is another gear 28$^b$ of suitable size, preferably larger, which connects with the drive gear 33 of the high speed apparatus, and all the remaining high speed apparatuses are connected by means of chains 34 and their engaging sprockets. It will be here noted that changes in the high speed may be made by changing the sprockets using more or less teeth as desired for changing the speed in any or all of the apparatuses and the same principle applies to the slower rotating apparatuses. On the main shaft 27 adjacent the gear 27$^b$ is another gear 27$^c$ of smaller size which engages with the intermediate gear 30 which is mounted on a stud secured to the main frame of the apparatus. This gear 30 engages with the lower gears on the first two of the apparatuses which produces the slower speed to these two apparatuses. Adjacent the pulley 27ª on the main drive shaft is another gear 27ᵈ which engages with an intermediate gear 32 which is mounted on a stud secured to the main frame of the apparatus. This intermediate gear 32 engages with the lower gear on the third apparatus. Mounted on a stud secured to the main frame is an intermediate gear 31 which connects the lower gear of the third apparatus with the lower gear of the fourth apparatus, thus driving the fourth apparatus of the slow speed apparatus and all the following slow speed apparatuses are driven by means of chains 36 and their connecting sprockets which are secured to the slower speed shafts. It will be here noted that I prefer to drive the high speed on one side of the main apparatus and the slower speed on the opposite side as shown best in Fig. 1 of the drawings. However, in the cases when the machine or a plurality of the same are installed stationary the drive of the slow or high speed or the entire drive may be obtained by pulleys on counter shafts. The discharging rolls are driven by gears connected with the preceding high speed apparatus and the discharging carrier is driven by chain 35 and sprockets connecting with said preceding high speed apparatus.

Though I have shown and described a particular construction and certain modifications therefrom, I do not wish to be limited to these certain structures or their modifications, but desire to include in my invention the construction, combination and arrangement substantially as set forth in the appended claims.

Having thus described my invention, what I claim as new and desire to secure by Letters Patent is:

1. In an apparatus of the class described, the combination of means for first subjecting the fiber-bearing material to a crushing and denting action, means coöperating therewith for next subjecting said fiber-bearing material to a splitting and spreading action and means coöperating therewith for next subjecting said fiber-bearing material to a breaking action.

2. In an apparatus of the class described, the combination of means for first subjecting the fiber-bearing material to a crushing and denting action, means coöperating therewith for next subjecting said fiber-bearing material to a splitting and spreading action, means coöperating therewith for next subjecting said fiber-bearing material to a breaking action, and means coöperating therewith for next subjecting said fiber-bearing material to a more thorough breaking action.

3. In an apparatus of the class described, the combination of means for first subjecting the fiber-bearing material to a crushing and denting action, means coöperating therewith for next subjecting said fiber-bearing material to a splitting and spreading action, means coöperating therewith for next subjecting said fiber-bearing material to a breaking action, and means coöperating therewith for next subjecting said fiber bearing material to a cleaning, combing and degumming action.

4. In an apparatus of the class described, the combination of means for first subjecting fiber bearing material to a crushing and denting action, means coöperating therewith for next subjecting said fiber bearing material to a splitting and spreading action, means coöperating therewith for next subjecting said fiber bearing material to a cleaning, combing, whipping, scutching and degumming action and means coöperating therewith for next subjecting said fiber bearing material to a more thorough breaking action.

5. In an apparatus of the class described, the combination of means for first subjecting the fiber-bearing material to a crushing and denting action, means coöperating therewith for next subjecting said fiber-bearing material to a splitting and spreading action, means coöperating therewith for next subjecting said fiber-bearing material to a breaking action, and means coöperating therewith for feeding said fiber-bearing material to said crushing and denting means which subjects said material to a spreading and separating action.

6. In an apparatus of the class described, the combination of means for feeding fiber bearing material, means for next subjecting said fiber bearing material to a scutching action comprising a pair of rotating scutching devices arranged on opposite sides of said material and adapted to engage therewith, means for next subjecting said fiber bearing material to a conveying action.

7. In an apparatus of the class described, the combination of means for first subjecting the fiber-bearing material to a crushing and denting action, means coöperating therewith for next subjecting said fiber-bearing material to a splitting and spreading action, means coöperating therewith for next subjecting said fiber-bearing material to a breaking action, means coöperating therewith for next subjecting said fiber-bearing material to a cleaning, combing and degumming action, and means coöperating therewith for feeding said fiber-bearing material to said crushing and denting means which subjects said material to a spreading and separating action.

8. In an apparatus of the class described, the combination of means for first subjecting the fiber-bearing material to a crushing and denting action, means coöperating therewith for next subjecting said fiber-bearing material to a splitting and spreading action, means coöperating therewith for next subjecting said fiber-bearing material to a breaking action, means coöperating therewith for next subjecting said fiber-bearing material to a cleaning, combing and degumming action, and means coöperating therewith for subjecting said fiber-bearing material to a softening action and for holding said fiber-bearing material to facilitate the cleaning, combing and degumming action.

9. In an apparatus of the class described, means for first subjecting fiber-bearing material to a crushing and denting action, means for next subjecting said fiber-bearing material to a splitting and spreading action, means for next subjecting said fiber-bearing material to a breaking action, means for subjecting said fiber-bearing material to a cleaning, combing, softening and degumming action, all of said cleaning, combing, softening and degumming means interchangeable in their arrangement for action relatively to each other.

10. In an apparatus of the class described means for first subjecting fiber-bearing material to a crushing and denting action; means for next subjecting said fiber-bearing material to a breaking action; means for next subjecting said fiber-bearing material to a splitting and spreading action; means for next subjecting said fiber-bearing material to a cleaning, combing, softening and degumming action, said means interchangeable in their arrangement for action relatively to each other.

11. In an apparatus of the class described, the combination of means for first subjecting fiber bearing material to a feeding action, means for next subjecting said fiber bearing material to a scutching action, comprising a plurality of pairs of scutching devices arranged so that each pair has a device on each side of the material to be scutched and adapted to engage said material and means for next subjecting said fiber bearing material to a conveying action.

12. In an apparatus of the class described, the combination of means for first subjecting fiber bearing materials to a breaking action, means for next subjecting said fiber bearing material to a scutching action comprising, a pair of rotating scutching devices arranged on opposite sides of the material to be scutched and adapted to engage therewith and means for next subjecting said fiber bearing material to a conveying action.

13. In an apparatus of the class described, the combination of means for first subjecting fiber bearing material to a breaking action, means for next subjecting said fiber bearing material to a scutching action comprising, a plurality of pairs of scutching devices arranged so that one device of each pair is on opposite sides of said material to be scutched and adapted to engage said material and means for next subjecting said fiber bearing material to a conveying action.

14. In an apparatus of the class described, the combination of means for subjecting fiber-bearing material to a cleaning action, means for subjecting fiber-bearing material to a combing action, and means for subjecting fiber-bearing material to a degumming action each consisting of a plurality of rotatable blades each provided with a plurality of projections in the outer edges of said blades each projection provided with a plurality of miniature projections thereon.

15. In an apparatus of the class described, means for subjecting fiber-bearing material to a cleaning, combing and degumming action consisting of a plurality of rotatable blades each provided with a plurality of projections in its outer edge, the projections on one blade being in staggered relation to the projections on the adjacent blade on the same rotating member.

16. In an apparatus of the class described, means for subjecting fiber-bearing material to a cleaning, combing and degumming action consisting of a plurality of rotatable blades each provided with a plurality of projections in its outer edge, the projections on one blade being in staggered relation to the projections on the adjacent blade on the same rotating member and so positioned on the alternate blade in opposite directions whereby a more thorough cleaning, combing and degumming action is provided.

17. In an apparatus of the class described, means for subjecting fiber-bearing material to a cleaning, combing and degumming action consisting of a pair of rotatable apparatuses positioned one above the other, each provided with a plurality of blades each of which is provided with a plurality of projections in the outer edge, each projection provided with a plurality of miniature projections said blades so positioned in their operative relation to each other that the outer edge of one blade on one of said apparatuses is between the two blades on the opposite apparatus.

18. In an apparatus of the class described, means for subjecting fiber-bearing material to a cleaning, combing and degumming action consisting of a pair of rotatable apparatuses positioned one above the other, each provided with a plurality of blades each of which is provided with a plurality of projections in the outer edge, each projection provided with a plurality of miniature projections said blades so positioned in their operative relation to each other that the outer edge of one blade on one of said apparatuses is between the two blades on the opposite apparatus, and means for adjusting the depth of the intermediate blade with the two blades on the opposite apparatus.

19. In an apparatus of the class described, means for subjecting fiber-bearing material to a cleaning, combing and degumming action consisting of a pair of rotatable apparatuses positioned one above the other, each provided with a plurality of blades each of which is provided with a plurality of miniature projections on its outer edge and said blades so positioned in their operative relation to each other that the outer edge of one blade on one of said apparatuses is between the two blades of the opposite apparatus, and means for adjusting the depth of the intermediate blade in relation to the two blades on the opposite apparatus, the projections on the blades of the opposing apparatus are so positioned on the blade of one apparatus relatively to the second blade in operation on the opposite apparatus is in staggered relation whereby the projections on the several blades of the pair of apparatuses penetrate into and act upon each and every particle of fiber material thereby freeing the fiber from the gum in dust like crystal form and also providing a scutching, combing and stripping action which eliminates the other matter not fiber from the fiber.

20. In an apparatus of the class described, means for subjecting fiber-bearing material to a cleaning, combing and degumming action consisting of a plurality of rotatable blades each provided with a plurality of projections in its outer edge, each projection provided with a plurality of miniature projections, and means for adjusting said blades inwardly and outwardly.

21. In an apparatus of the class described, means for subjecting fiber-bearing material to a cleaning, combing and degumming action consisting of a plurality of rotatable blades each provided with a plurality of projections in its outer edge, means for adjusting said blades inwardly and outwardly, and means for adjusting the angle of said blades relatively to the radial.

22. In an apparatus of the class described, the combination of means for subjecting fiber bearing material to a breaking action, means for next subjecting said fiber bearing material to a scutching and combing action consisting of a pair of rotating members arranged on opposite sides of said material and provided with a plurality of blades each blade provided with a plurality of projections on their outer surface engaging said material and means for next subjecting said fiber bearing material to a conveying action.

23. In an apparatus of the class described, means for subjecting fiber-bearing material to a cleaning, combing and degumming action, consisting of a plurality of rotatable blades each provided with a plurality of projections in its outer edge and means for adjusting the angle of each of said blades relatively to the radial.

24. In an apparatus of the class described, means for subjecting fiber-bearing material to a cleaning, combing and degumming action, consisting of a plurality of rotatable blades each provided with a plurality of projections in its outer edge, means for adjusting the angle of each of said blades relatively to the radial, and means for adjusting each of said blades inwardly and outwardly.

25. In an apparatus of the class described, the combination of means for subjecting the fiber-bearing material to a crushing and denting action, means coöperating therewith for subjecting said fiber-bearing material to a splitting and spreading action, means coöperating therewith for subjecting said fiber-bearing material to a breaking action, means for coöperating therewith for subjecting said fiber-bearing material to a cleaning, combing and degumming action consisting of a plurality of rotatable blades each provided with a plurality of projections in its outer edge, and means for adjusting the angle of each of said blades relative to the radial.

26. In an apparatus of the class described, the combination of means for subjecting the fiber-bearing material to a crushing and denting action, means coöperating therewith for subjecting said fiber-bearing material to a splitting and spreading action, means coöperating therewith for subjecting said fiber-bearing material to a breaking action, means coöperating therewith for subjecting said fiber-bearing material to a cleaning, combing and degumming action consisting of a plurality of rotatable blades each provided with a plurality of projections in its outer edge, means for adjusting each of said blades inwardly and outwardly and means for adjusting the angle of each of said blades relatively to the radial.

27. In an apparatus of the class described, means for subjecting fiber-bearing material to a whipping, cleaning, and scutching action consisting of a plurality of rotatable blades provided with beveled outer edges and means for adjusting the angles of said blades relatively to the radial.

28. In an apparatus of the class described, means for subjecting fiber-bearing material to a whipping, cleaning and scutching action consisting of a plurality of rotatable blades provided with beveled outer edges, means for adjusting said blades inwardly and outwardly and means for adjusting the angle of said blades relatively to the radial.

29. In an apparatus of the class described, the combination of means for subjecting the fiber-bearing material to a crushing and denting action, means coöperating therewith for subjecting said fiber-bearing material to a splitting and spreading action, means coöperating therewith for subjecting said fiber-bearing material to a breaking action, means coöperating therewith for subjecting said fiber-bearing material to a whipping, cleaning and scutching action consisting of a plurality of rotatable blades each provided with a beveled edge, means for adjusting said blades inwardly and outwardly, and means for adjusting the angle of said blades relatively to the radial.

30. In an apparatus of the class described, the combination of means for subjecting the fiber-bearing material to a crushing and denting action, means coöperating therewith for subjecting said fiber-bearing material to a splitting and spreading action, means coöperating therewith for subjecting said fiber-bearing material to a breaking action, means coöperating therewith for subjecting said fiber-bearing material to a whipping, cleaning and scutching action consisting of a plurality of rotatable blades each provided with a beveled edge, means for adjusting said blades inwardly and outwardly, and means coöperating therewith for subjecting said fiber-bearing material to a cleaning, combing and degumming action consisting of a plurality of rotatable blades each provided with a plurality of projections in its outer edge.

31. In an apparatus of the class described, means for subjecting fiber-bearing material to a whipping, cleaning and scutching action consisting of a rotatable apparatus provided with a plurality of blades each provided with beveled edges and a U shaped guard member positioned either above or below said rotatable apparatus whereby the blades on said rotatable apparatus pass in close proximity to the convex portion of said guard member and between which the fiber bearing material passes.

32. In an apparatus of the class described, means for subjecting fiber-bearing material to a cleaning, combing and degumming action consisting of a rotatable apparatus provided with a plurality of blades, each provided with a plurality of projections in its outer edge, a U shaped guard member mounted either above or below said rotatable apparatus and so positioned that the blades of said rotatable apparatus pass in close proximity to the convex surface of said guard member and between which the fiber-bearing material passes.

33. In an apparatus of the class described, the combination of means for subjecting fiber-bearing material to a cleaning, combing, degumming, scutching and whipping action consisting of a plurality of rotatable apparatuses each rotatable apparatus provided with a plurality of blades, a plurality of U shaped guards positioned so that their curved surfaces are in close proximity to the outer edges of said blades in operation and arranged so that one rotatable apparatus and one U shaped guard coöperate together.

34. In an apparatus of the class described, means for subjecting fiber bearing material to a cleaning, combing and degumming action consisting of a pair of rotatable members arranged on opposite sides of the material, each provided with a plurality of projections extending from their outer surface so positioned and formed as to penetrate each and every part of the fiber material.

35. In an apparatus of the class described, means for subjecting the fiber-bearing material to a crushing and denting action, means for coöperating therewith for subjecting said fiber-bearing material to a splitting and spreading action, means coöperating therewith for subjecting said fiber-bearing material to a breaking action, and means coöperating therewith for subjecting said fiber-bearing material to a cleaning, combing and degumming action, the latter means comprising a plurality of sets of rotatable apparatuses, each provided with a plurality of blades, each blade provided with a plurality of projections on its outer edge, the projections on the blades of the different sets varying in accordance with the material.

36. In an apparatus of the class described, means for subjecting the fiber-bearing material to a crushing and denting action, means coöperating therewith for subjecting said fiber-bearing material to a splitting and spreading action, means coöperating therewith subjecting said fiber-bearing material to a breaking action, means coöperating therewith for subjecting said fiber-bearing material to a cleaning, combing and degumming action, the latter means comprising a plurality of sets of rotatable apparatuses, each provided with a plurality of blades, each blade provided with a plurality of projections on its outer edge, the blades being interchangeable in form, and a plurality of pairs of longitudinally corrugated rolls arranged in connection with said rotatable apparatuses for softening said material and holding said material taut for proper treatment by said cleaning, combing and degumming apparatuses by reason of the pressure brought to bear on said fiber because of the close proximity of said rolls to each other and the difference in the speed of said corrugated rolls relatively to said cleaning, combing and degumming apparatuses causing said fiber-bearing material to be taut while passing said apparatus.

37. In an apparatus of the class described, the combination of means for first subjecting the fiber-bearing material to a crushing and denting action, means coöperating therewith for next subjecting said fiber-bearing material to a splitting and spreading action, means coöperating therewith for next subjecting said fiber-bearing material to a breaking action, means coöperating therewith for next subjecting said fiber-bearing material to a cleaning, combing and degumming action, and a plurality of means coöperating therewith for next subjecting said fiber-bearing material to a more thorough combing and degumming action.

38. In an apparatus of the class described, the combination of means for first subjecting the fiber-bearing material to a crushing and denting action, means coöperating therewith for next subjecting said fiber-bearing material to a splitting and spreading action, means coöperating therewith for next subjecting said fiber-bearing material to a breaking action, means coöperating therewith for next subjecting said fiber-bearing material to a more thorough breaking action, means coöperating therewith for next subjecting said fiber-bearing material to a cleaning, combing and degumming action, a plurality of means coöperating therewith for next subjecting said fiber-bearing material to a more thorough combing and degumming action, and means coöperating therewith for next subjecting said fiber-bearing material to a softening action.

39. In an apparatus of the class described, the combination of means for first subjecting the fiber-bearing material to a crushing and denting action, means coöperating therewith for next subjecting said fiber-bearing material to a splitting and spreading action, means coöperating therewith for next subjecting said fiber-bearing material to a breaking action, means coöperating therewith for next subjecting said fiber-bearing material to a more thorough breaking action, means coöperating therewith for subjecting said fiber-bearing material to a cleaning, combing and degumming action, a plurality of means coöperating therewith for subjecting said fiber-bearing material to a more thorough combing and degumming action, means coöperating therewith for subjecting said fiber-bearing material to a softening action, and means coöperating therewith for subjecting said fiber-bearing material to a more thorough softening action.

40. In an apparatus of the class described, the combination of means for first subjecting the fiber-bearing material to a crushing and denting action, means coöperating therewith for next subjecting said fiber-bearing material to a splitting and spreading action, means coöperating therewith for next subjecting said fiber-bearing material to a breaking action, means coöperating therewith for next subjecting said fiber-bearing material to a more thorough breaking, combing and degumming action, a plurality of means coöperating therewith for next subjecting said fiber-bearing material to a more thorough combing and degumming action, means coöperating therewith for next subjecting said fiber-bearing material to a softening action, means coöperating therewith for next subjecting said fiber-bearing material to a more thorough softening action, said last mentioned means comprising a plurality of longitudinally corrugated sets of rolls, each set of rolls in close proximity to each other to cause pressure on said fiber-bearing material and positioned in line of travel of said fiber-bearing material.

41. In an apparatus of the class described, the combination of means for first subjecting the fiber-bearing material to a crushing and denting action, means coöperating therewith for next subjecting said fiber-bearing material to a splitting and spreading action, means coöperating therewith for next subjecting said fiber-bearing material to a breaking action, means coöperating therewith for next subjecting said fiber-bearing material to a more thorough breaking, means coöperating therewith for next subjecting said fiber-bearing material to a combing, cleaning and degumming action, a plurality of means for next subjecting said fiber-bearing material to a more thorough combing, cleaning and degumming action, means coöperating therewith for next subjecting said fiber-bearing material to a softening action, means coöperating therewith for next subjecting said fiber-bearing material to a more thorough softening action, said last mentioned means comprising a plurality of sets of rolls, each set of rolls in close proximity to each other to cause pressure on said fiber-bearing material and positioned in line of travel of said fiber-bearing material.

42. In an apparatus of the class described, the combination of means for first subjecting the fiber-bearing material to a crushing and denting action, means coöperating therewith for next subjecting said fiber-bearing material to a splitting and spreading action, means coöperating therewith for next subjecting said fiber-bearing material to a breaking action, means coöperating therewith for next subjecting said fiber-bearing material to a cleaning, combing and degumming action, means coöperating therewith for next subjecting said fiber-bearing material to a softening action, means coöperating therewith for next subjecting said fiber-bearing material to a more thorough combing and degumming action, means coöperating therewith for next subjecting said fiber-bearing material to a cleaning, scutching and whipping action, means coöperating therewith for next subjecting said fiber-bearing material to a more thorough cleaning, degumming and whipping action, means coöperating therewith for next subjecting said fiber-bearing material to a more thorough softening action comprising a plurality of sets of rolls, each set of rolls in close enough proximity to each other to cause pressure on said fiber-bearing material and positioned in line of travel of said fiber-bearing material.

43. In an apparatus of the class described, the combination of means for first subjecting the fiber-bearing material to a crushing and denting action, means coöperating therewith for next subjecting said fiber-bearing material to a splitting and spreading action, means coöperating therewith for next subjecting said fiber-bearing material to a cleaning, combing and degumming action, means coöperating therewith for next subjecting said fiber-bearing material to a softening action, means coöperating therewith for next subjecting said fiber-bearing material to a more thorough combing and degumming action, means coöperating therewith for next subjecting said fiber-bearing material to a cleaning, scutching and whipping action, means coöperating therewith for next subjecting said fiber-bearing material to a more thorough cleaning, degumming and whipping action, means coöperating therewith for next subjecting said fiber-bearing material to a more thorough softening action comprising a plurality of sets of rolls, each set of rolls in close enough proximity to each other to cause pressure on said fiber-bearing material and positioned in line of travel of said fiber-bearing material, and means coöperating therewith for subjecting said fiber-bearing material to a more thorough cleaning, combing and degumming action comprising a plurality of sets of rotating apparatuses, each provided with a plurality of blades, each blade provided with a plurality of projections thereon, said rotatable apparatuses positioned in line of travel of said fiber-bearing material, the apparatuses and blades positioned relatively to each other so that very short length fiber material will be acted upon thereby.

44. In an apparatus of the class described, means for subjecting short length fiber bearing material to a cleaning, combing, degumming, scutching and whipping action consisting of a pair of rotating scutching devices arranged on opposite sides of said material, a pair of slower speed feeding rolls arranged in close proximity thereto and another pair of rolls on the opposite side of said pair of scutching devices in close proximity to said scutching devices.

45. In an apparatus of the class described, means for scutching fiber bearing material, comprising, a pair of rolls, a plurality of rotatable and adjustable blades provided with a plurality of projections on each blade in close proximity to said rolls and revolved at a more rapid speed adapted to receive the material from said rolls and another pair of rolls on the opposite side of said rotatable blades from said first mentioned rolls adapted to receive the material from said rotatable blades.

46. In an apparatus of the class described, means for scutching fiber bearing material, comprising, a pair of rolls between which said fiber bearing material passes, a rotating member provided with a plurality of blades provided with a plurality of projections on its outer edge in close proximity to said rolls and adapted to engage said fiber bearing material on one side revolved at a more rapid rate of speed that said rolls, means on the opposite side of said fiber bearing material for holding said fiber bearing material against said blades in close proximity to said rolls and another pair of rolls adapted to receive the material from said blades.

47. In an apparatus of the class described, means for discharging fiber from the apparatus comprising a pair of revoluble rolls in close proximity to each other, means thereon for preventing the fiber from wrapping on said rolls and means coöperating therewith for discharging said fiber from said rolls in an endless folded form comprising an apron pivotally mounted at one end thereof and means for moving said apron back and forth on its pivotal mounting.

48. The herein described method of treating fiber-bearing material consisting in crushing said material and denting its outer surface, then splitting and spreading the same, then breaking the woody matter contained therein, then cleaning said woody matter therefrom.

49. The herein described method of treating fiber-bearing material consisting in crushing said material and denting its outer surface, then splitting and spreading the same, then breaking the woody matter contained therein, then cleaning said woody matter therefrom, then combing and degumming said fiber.

50. The herein described method of treating fiber-bearing material consisting in crushing and denting said material, then splitting and separating the said material, then breaking the woody and pulpy matter in said material, then more thoroughly breaking the woody and pulpy matter of said material, then cleaning, combing and degumming said material.

51. The herein described method of treating fiber-bearing material consisting in crushing and denting said material, then splitting and separating the said material, then breaking the woody and pulpy matter in said material, then more thoroughly breaking the woody and pulpy matter of said material, then cleaning, combing, degumming, scutching and whipping said material.

52. The herein described method of treating fiber-bearing material consisting in crushing and denting said material, then splitting and separating the said material, then breaking the woody and pulpy matter in said material, then more thoroughly breaking the woody and pulpy matter of said material, then cleaning, combing, degumming, scutching and whipping said material, then softening said material.

53. The herein described method of treating fiber-bearing material consisting in crushing and denting said material, then splitting and separating the said material, then breaking the woody and pulpy matter in said material, then more thoroughly breaking the woody and pulpy matter of said material, then cleaning, combing, degumming, scutching and whipping said material, then shaking said material.

54. The herein described method of treating fiber-bearing material consisting in crushing and denting said material, then splitting and separating said material, then breaking the woody and pulpy matter in said material, then cleaning, combing and degumming the fiber of said material, then shaking said fiber.

55. The herein described method of treating fiber-bearing material consisting in crushing and denting the material, then splitting and separating said material, then breaking the woody and pulpy matter in said material, then cleaning, combing, and degumming the fiber of said material, then shaking said fiber, then folding the fiber.

56. The herein described method of treating fiber-bearing material consisting in crushing and denting said material, then splitting and separating said material, then breaking the woody and pulpy matter in said material, then cleaning, combing and degumming said material, then softening said material, then more thoroughly cleaning, combing and degumming said material.

57. The herein described method of treating fiber-bearing material consisting in crushing and denting said material, then splitting and separating said material, then breaking the woody and pulpy matter in said material, then cleaning, combing and degumming said material, then softening said material, then more thoroughly cleaning, combing and degumming said material, then more thoroughly softening said material.

58. The herein described method of treating fiber-bearing material, consisting in crushing and denting said material, then splitting and separating said material, then breaking the woody and pulpy matter in said material, then cleaning, combing and degumming said material, then softening said material, then more thoroughly cleaning, combing and degumming said material, then more thoroughly softening said material, then shaking said material.

59. The herein described method of treating fiber-bearing material consisting in crushing and denting said material, then splitting and separating said material, then breaking the woody and pulpy matter in said material, then cleaning, combing and degumming said material, then softening said material, then more thoroughly cleaning, combing and degumming said material, then more thoroughly softening said material, then shaking said material, then discharging the fiber in a straight line in hank form.

In testimony whereof, I have hereunto set my hand at San Diego, California this 16th day of December 1916.

GEORGE WILLIAM SCHLICHTEN.